United States Patent [19]
Woods

[11] Patent Number: 4,910,401
[45] Date of Patent: Mar. 20, 1990

[54] LWIR SENSOR SYSTEM WITH IMPROVED CLUTTER REJECTION

[75] Inventor: Weightstill W. Woods, Redmond, Wash.

[73] Assignee: The Boeing Company, Seattle, Wash.

[21] Appl. No.: 341,131

[22] Filed: Jan. 20, 1982

[51] Int. Cl.⁴ .................. H01L 25/00; G02B 26/10
[52] U.S. Cl. .................................. 250/332; 250/334; 250/349; 358/213.28
[58] Field of Search ............... 250/332, 334, 338, 342, 250/347, 349, 578; 356/1, 4, 141, 152; 358/212, 213, 113, 213.24, 213.28

[56] References Cited
U.S. PATENT DOCUMENTS

| | | | |
|---|---|---|---|
| 3,684,374 | 8/1972 | Humphrey | 356/4 |
| 3,723,642 | 3/1973 | Laakmann | 178/6 |
| 3,941,923 | 3/1976 | Wheeler | 250/334 |
| 4,004,852 | 1/1977 | Pentecost | 356/4 |
| 4,071,853 | 1/1978 | Yamanaka | 358/41 |
| 4,185,298 | 1/1980 | Billet et al. | 358/106 |
| 4,204,230 | 5/1980 | Sprague | 358/213 |
| 4,222,065 | 9/1980 | Pusch | 358/113 |

Primary Examiner—Stephen C. Buczinski
Attorney, Agent, or Firm—John C. Hammar

[57] ABSTRACT

The system comprises a scanning telescope for scanning a field of view in a vertical direction. A detector array is positioned in the focal plane of the telescope for receiving radiant energy from the scanned image. The detector array comprises a plurality of elements which are positioned such that adjacent elements along the scan direction are offset with respect to each other. A processor receives output signals from each of the elements. The processor delays the signals received from leading elements in the array and adds these delayed signals to output signals from trailing elements in the array to form pseudodetector sums. Pseudodetector sums formed in this manner are geometrically filtered in a cross-scan direction and also filtered in the along scan direction.

25 Claims, 14 Drawing Sheets

FIG. 5
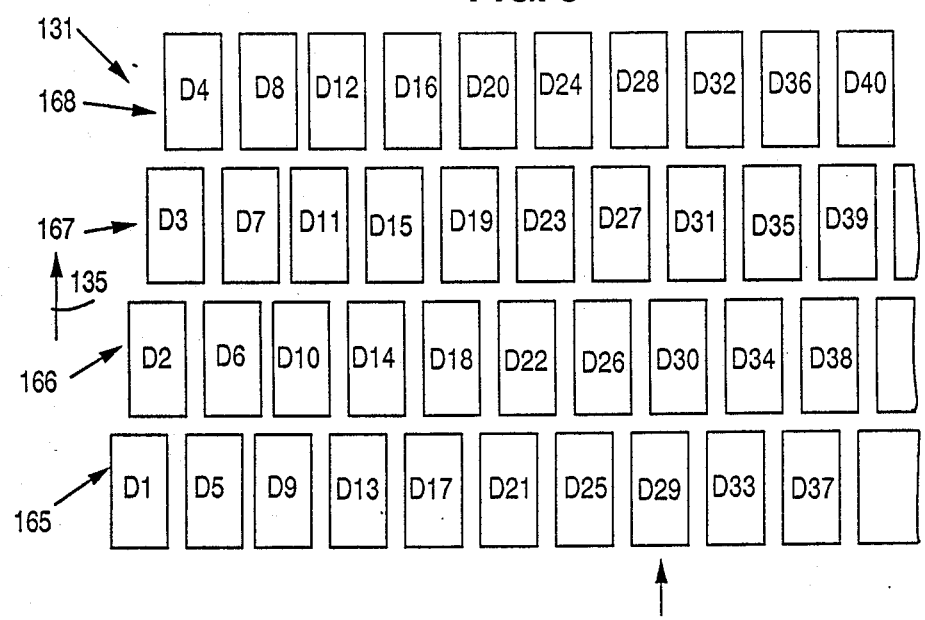
FIG. 6
| PSEUDODETECTOR SUM | P1 | P2 | P3 | P4 | P5 | P6 | P7 | P8 | P9 | P10 |
|---|---|---|---|---|---|---|---|---|---|---|
| DETECTORS | D4 D3 D2 D1 | D4 D3 D2 D5 | D4 D3 D6 D5 | D4 D7 D6 D5 | D8 D7 D6 D5 | D8 D7 D6 D9 | D8 D7 D10 D9 | D8 D11 D10 D9 | D12 D11 D10 D9 | D12 D11 D10 D13 |
FIG. 8
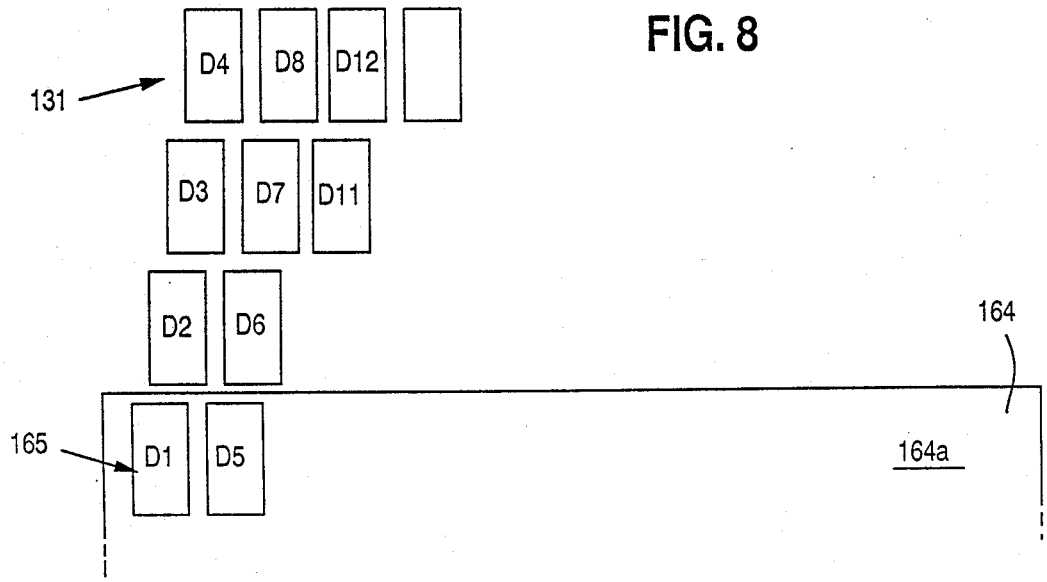

FIG. 13

TIME DELAY DATA STORAGE MAP

| MEMORY START LOCATION | 0 (D1) | 1 (D2) | 2 (D3) | 3 (D4) | 4 (D5) | 5 (D6) | 6 (D7) | 7 (D8) | 10 (D9) | 11 (D10) | 12 (D11) | 13 (D12) | 14 (D13) | 15 (D14) | 16 (D15) | 17 (D16) |
|---|---|---|---|---|---|---|---|---|---|---|---|---|---|---|---|---|
| 400 | | | | | | | | | | | | | | | | |
| 360 | | 4 | 8 | 12 | | 4 | 8 | 12 | | 4 | 8 | 12 | | 4 | 8 | 12 |
| 340 | | 3 | 7 | 11 | | 3 | 7 | 11 | | 3 | 7 | 11 | | 3 | 7 | 11 |
| 320 | 14 | 2 | 6 | 10 | | 2 | 6 | 10 | | 2 | 6 | 10 | | 2 | 6 | 10 |
| 300 | 13 | 1 | 5 | 9 | 13 | 1 | 5 | 9 | 13 | 1 | 5 | 9 | 13 | 1 | 5 | 9 |
| 260 | 12 | | 4 | 8 | 12 | | 4 | 8 | 12 | | 4 | 8 | 12 | | 4 | 8 |
| 240 | 11 | | 3 | 7 | 11 | | 3 | 7 | 11 | | 3 | 7 | 11 | | 3 | 7 |
| 220 | 10 | 14 | 2 | 6 | 10 | | 2 | 6 | 10 | | 2 | 6 | 10 | | 2 | 6 |
| 200 | 9 | 13 | 1 | 5 | 9 | 13 | 1 | 5 | 9 | 13 | 1 | 5 | 9 | 13 | 1 | 5 |
| 160 | 8 | 12 | | 4 | 8 | 12 | | 4 | 8 | 12 | | 4 | 8 | 12 | | 4 |
| 140 | 7 | 11 | | 3 | 7 | 11 | | 3 | 7 | 11 | | 3 | 7 | 11 | | 3 |
| 120 | 6 | 10 | 14 | 2 | 6 | 10 | | 2 | 6 | 10 | | 2 | 6 | 10 | | 2 |
| 100 | 5 | 9 | 13 | 1 | 5 | 9 | 13 | 1 | 5 | 9 | 13 | 1 | 5 | 9 | 13 | 1 |
| 60 | 4 | 8 | 12 | | 4 | 8 | 12 | | 4 | 8 | 12 | | 4 | 8 | 12 | |
| 40 | 3 | 7 | 11 | | 3 | 7 | 11 | | 3 | 7 | 11 | | 3 | 7 | 11 | |
| 20 | 2 | 6 | 10 | 14 | 2 | 6 | 10 | | 2 | 6 | 10 | | 2 | 6 | 10 | |
| 00 | 1 | 5 | 9 | 13 | 1 | 5 | 9 | 13 | 1 | 5 | 9 | 13 | 1 | 5 | 9 | 13 |

DETECTOR NO.

FIG. 14

TIME DELAY DATA STORAGE MAP

| MEMORY START LOCATION | 0 (D1) | 1 (D2) | 2 (D3) | 3 (D4) | 4 (D5) | 5 (D6) | 6 (D7) | 7 (D8) | 10 (D9) | 11 (D10) | 12 (D11) | 13 (D12) | 14 (D13) | 15 (D14) | 16 (D15) | 17 (D16) |
|---|---|---|---|---|---|---|---|---|---|---|---|---|---|---|---|---|
| 400 | | | | | | | | | | | | | | | | |
| 360 | 16 | 4 | 8 | 12 | | 4 | 8 | 12 | | 4 | 8 | 12 | | 4 | 8 | 12 |
| 340 | 15 | 3 | 7 | 11 | 15 | 3 | 7 | 11 | 15 | 3 | 7 | 11 | 15 | 3 | 7 | 11 |
| 320 | 14 | 2 | 6 | 10 | 14 | 2 | 6 | 10 | 14 | 2 | 6 | 10 | 14 | 2 | 6 | 10 |
| 300 | 13 | 1 | 5 | 9 | 13 | 1 | 5 | 9 | 13 | 1 | 5 | 9 | 13 | 1 | 5 | 9 |
| 260 | 12 | 16 | 4 | 8 | 12 | | 4 | 8 | 12 | | 4 | 8 | 12 | | 4 | 8 |
| 240 | 11 | 15 | 3 | 7 | 11 | 15 | 3 | 7 | 11 | 15 | 3 | 7 | 11 | 15 | 3 | 7 |
| 220 | 10 | 14 | 2 | 6 | 10 | 14 | 2 | 6 | 10 | 14 | 2 | 6 | 10 | 14 | 2 | 6 |
| 200 | 9 | 13 | 1 | 5 | 9 | 13 | 1 | 5 | 9 | 13 | 1 | 5 | 9 | 13 | 1 | 5 |
| 160 | 8 | 12 | 16 | 4 | 8 | 12 | | 4 | 8 | 12 | | 4 | 8 | 12 | | 4 |
| 140 | 7 | 11 | 15 | 3 | 7 | 11 | 15 | 3 | 7 | 11 | 15 | 3 | 7 | 11 | 15 | 3 |
| 120 | 6 | 10 | 14 | 2 | 6 | 10 | 14 | 2 | 6 | 10 | 14 | 2 | 6 | 10 | 14 | 2 |
| 100 | 5 | 9 | 13 | 1 | 5 | 9 | 13 | 1 | 5 | 9 | 13 | 1 | 5 | 9 | 13 | 1 |
| 60 | 4 | 8 | 12 | 16 | 4 | 8 | 12 | | 4 | 8 | 12 | | 4 | 8 | 12 | |
| 40 | 3 | 7 | 11 | 15 | 3 | 7 | 11 | 15 | 3 | 7 | 11 | 15 | 3 | 7 | 11 | 15 ← |
| 20 | 2 | 6 | 10 | 14 | 2 | 6 | 10 | 14 | 2 | 6 | 10 | 14 | 2 | 6 | 10 | 14 |
| 00 | 1 | 5 | 9 | 13 | 1 | 5 | 9 | 13 | 1 | 5 | 9 | 13 | 1 | 5 | 9 | 13 |

DETECTOR NO.

FIG. 15

TIME DELAY DATA STORAGE MAP

| MEMORY START LOCATION | | | | | | | | | | | | | | | | | |
|---|---|---|---|---|---|---|---|---|---|---|---|---|---|---|---|---|---|
| 400 | | | | | | | | | | | | | | | | | |
| 360 | 16 | 4 | 8 | 12 | 16 | 4 | 8 | 12 | 16 | 4 | 8 | 12 | 16 | 4 | 8 | 12 | |
| 340 | 15 | 3 | 7 | 11 | 15 | 3 | 7 | 11 | 15 | 3 | 7 | 11 | 15 | 3 | 7 | 11 | |
| 320 | 14 | 18 | 6 | 10 | 14 | 2 | 6 | 10 | 14 | 2 | 6 | 10 | 14 | 2 | 6 | 10 | |
| 300 | 13 | 17 | 5 | 9 | 13 | 17 | 5 | 9 | 13 | 17 | 5 | 9 | 13 | 17 | 5 | 9 | |
| 260 | 12 | 16 | 4 | 8 | 12 | 16 | 4 | 8 | 12 | 16 | 4 | 8 | 12 | 16 | 4 | 8 | |
| 240 | 11 | 15 | 3 | 7 | 11 | 15 | 3 | 7 | 11 | 15 | 3 | 7 | 11 | 15 | 3 | 7 | |
| 220 | 10 | 14 | 18 | 6 | 10 | 14 | 2 | 6 | 10 | 14 | 2 | 6 | 10 | 14 | 2 | 6 | |
| 200 | 9 | 13 | 17 | 5 | 9 | 13 | 17 | 5 | 9 | 13 | 17 | 5 | 9 | 13 | 17 | 5 | |
| 160 | 8 | 12 | 16 | 4 | 8 | 12 | 16 | 4 | 8 | 12 | 16 | 4 | 8 | 12 | 16 | 4 | |
| 140 | 7 | 11 | 15 | 3 | 7 | 11 | 15 | 3 | 7 | 11 | 15 | 3 | 7 | 11 | 15 | 3 | |
| 120 | 6 | 10 | 14 | 18 | 6 | 10 | 14 | 2 | 6 | 10 | 14 | 2 | 6 | 10 | 14 | 2 | |
| 100 | 5 | 9 | 13 | 17 | 5 | 9 | 13 | 17 | 5 | 9 | 13 | 17 | 5 | 9 | 13 | 17 | ← |
| 60 | 4 | 8 | 12 | 16 | 4 | 8 | 12 | 16 | 4 | 8 | 12 | 16 | 4 | 8 | 12 | 16 | |
| 40 | 3 | 7 | 11 | 15 | 3 | 7 | 11 | 15 | 3 | 7 | 11 | 15 | 3 | 7 | 11 | 15 | |
| 20 | 18 | 6 | 10 | 14 | 2 | 6 | 10 | 14 | 2 | 6 | 10 | 14 | 2 | 6 | 10 | 14 | |
| 00 | 17 | 5 | 9 | 13 | 17 | 5 | 9 | 13 | 17 | 5 | 9 | 13 | 17 | 5 | 9 | 13 | |
| | 0 (D1) | 1 (D2) | 2 (D3) | 3 (D4) | 4 (D5) | 5 (D6) | 6 (D7) | 7 (D8) | 10 (D9) | 11 (D10) | 12 (D11) | 13 (D12) | 14 (D13) | 15 (D14) | 16 (D15) | 17 (D16) | |

DETECTOR NO.

LWIR SENSOR SYSTEM WITH IMPROVED CLUTTER REJECTION

The U.S. Government has rights in this invention pursuant to contract #DASG 60-76-C-0090 awarded by the Department of the Army.

BACKGROUND OF THE INVENTION

This invention relates to long wave infrared radiation imaging systems and especially to such systems which are adapted to distinguish far-field point source objects from near-field background clutter.

Presently, a refracting or reflecting telescope is used for the sensing, isolation and the characterization of radiation from far-field "point" sources. The telescope is boosted aloft in a rocket, aircraft or similar vehicle. The vehicle is positioned to view a threat train which may contain incoming targets such as hostile nuclear missiles. These targets are first detected at a great distance and appear as point source images to the telescope. The field of view of the telescope is imaged onto a focal surface and scanned across that surface with the intent of observing one or more such targets in a track-while-scan mode.

The concept is applicable to both electromagnetic and acoustic radiation. Long wave infrared wave lengths are preferentially employed in this task, as radiation detection devices in this region are available and capable of detection of a small number of photons per second emitted by a warm object at distances of several hundred miles. However, the combined effects of thermal radiation and the reflection of sunlight and earthshine and albedo produce distinguishable patterns for objects or clouds of objects, as characterized by angular extent, magnitude, and wave length distribution or "color". A typical detector configuration located at the focal plane of the telescope comprises individual detector elements consisting of separate semiconductor chips mounted to circuit boards upon which the wiring, load resistors and low-noise electronic amplifier elements are also mounted. The detectors are grouped typically in a series of two to four arrays, each with its own optical bandpass filter to allow characterization of incoming radiation according to wavelength distribution. Images of far-field objects are scanned across the arrays, either by mechanical motion of the telescope or by rotation of one or more optical elements within the telescope.

The image size of a far-field point source object is, in general, limited by diffraction of the telescope optical system, which produces a characteristic blur. The size of the detector elements has been determined based upon the size of the characteristic blur. Conventionally, the along-scan dimension of the detector elements is sized to match the along scan dimension of the blur. There are two reasons for this size consideration. Detector elements of significantly greater dimension than the blur produce signals of much poorer spatial resolution so that the position uncertainty of objects increases. When the detector elements are made small with respect to the blur, less radiation is intercepted by the detector, and the signal levels increase. Inasmuch as the noise floor for signal detection is generally limited by the amplifier and not the detector, the use of smaller detectors degrades the minimum size of objects which can be sensed and the range at which the objects can be detected.

In the cross-scan direction, other criteria must be considered. In order to sense and characterize all objects in a threat train, a significant field of view must be encompassed. The detector elements must in combination sweep out this field of view. On the other hand, the number of detectors is limited by the number of electronic channels which can be crowded into the focal plane array using available technology. A further limitation is imposed by the data processing hardware which can perform the needed pulse extraction, correlation and other data processing in real-time. Accordingly, to fill the field of view in several wavelength bands, the detectors have traditionally been made long in the cross-scan direction. These considerations lead to a detector length several times the minimum resolution element. In order to allow the determination of cross-scan position to an uncertainty small with respect to detector length, the positions of the detectors are staggered in the along scan direction.

Several difficulties are inherent in these detectors. First, when two targets approach each other at the same elevation position, the signals add together on a given detector and it becomes difficult to separate their radiometric qualities and pursue their magnitude and color classification. Second, since the detectors are several times the size of the point source image blur, their response to defocused clutter signals is relatively large. Finally, when an image crosses the end of a detector, the proportion of image energy falling on or off the detector is difficult to determine, and such measurements are generally discarded in radiometric value determination.

Improvement of the state of art of focal plane detector fabrication and signal processing hardware has lead to studies, proposals, and research into focal plane assemblies with large numbers of detectors, up to the thousands or hundreds of thousands. Typically, however, these arrays, or mosaics as they are called, are laid out in orthogonal rows and columns. To overcome the problems with partial image coverage, the detector sizes are made small with respect to the image blur size, leading, with reasonable fields of view, to detector numbers in the millions. Present readout and data processing technology is not capable of handling this arrangement.

Accordingly, a need has arisen for a focal plane detector array and a processing scheme which can overcome the above-discussed deficiencies and yet is capable of operation with present processing technology.

SUMMARY OF THE INVENTION

A principal object of the present invention is to provide a radiant imaging system which is capable of distinguishing point source targets from background, illumination and near-field particle clutter.

A further object of the present invention is to provide a radiant imaging system utilizing focal plane detector arrays wherein each detector is sized so as to produce a high degree of resolution and rejection of near-field clutter and yet wherein the array information output is compatible with present data processing techniques.

Another object of the present invention is to provide a radiant imaging system utilizing focal plane detector arrays wherein the detectors are oriented with respect to one another in a manner which allows maximum utilization of the information received therefrom.

Yet another object of the present invention is to provide a radiant imaging system which includes a processing technique wherein the time delayed summation of outputs of detectors in the focal plane detector array is made to form an equivalent mathematical single row of pseudodetectors of closer spacing, enabling the enhancement of signal-to-noise ratio.

A further object of the present invention is to provide a radiant imaging system in which data from a series of detector of the focal plane detector array is processed similarly in two orthogonal dimensions, the first dimension being purely geometrical in time stasis such that signals from point sources are extracted unambiguously from rapidly scintillating focused sources and background signals.

Another object of the present invention is to provide a radiant imaging system which has increased sensitivity for distinguishing between signals from two closely spaced objects.

In accordance with these and other objects, the radiant imaging system of the present invention comprises a means for optically scanning a field of view along a scan direction and applying received radiant energy onto a two dimensional focal plane. Detector means positioned in the focal plane receives the radiant energy. The detector means comprises a plurality of detector elements which are positioned in an array with adjacent elements along the scan direction being offset with respect to each other. Each of the elements produces an output signal which is delivered to a processing means. The processing means delays output signals from leading elements in the array and adds the delayed output signals to output signals from trailing elements in the array.

In accordance with a further aspect of the invention, the system is adapted to receive radiant energy from distant objects and to form diffraction-limited optical blurs on the focal plane. Each of the elements of the array has an along scan dimension approximately equal to the along scan dimension of the diffraction-limited optical blur and has a cross-scan dimension approximately equal to the cross-scan dimension of the diffraction-limited optical blur.

The elements are disposed in a plurality of aligned rows in the cross-scan direction. The adjacent elements in the along scan direction overlap and are offset by an amount equal to the detector spacing in a row divided by n, where n is the number of rows in the array.

The processing means includes means for forming a sum for each delayed combination of n sequentially staggered detectors. Each of the sums is defined as one pseudodetector sum. The processing means further includes means for geometrically filtering the pseudodetector sums in the cross-scan direction and also includes means for filtering the pseudodetector sums in the along scan direction.

BRIEF DESCRIPTION OF THE DRAWINGS

The above and other objects will become more readily apparent as the invention becomes more fully understood based on the following detailed description taken in connection with the drawings in which like numerals represent like parts throughout and in which:

FIG. 5 is a schematic representation showing the orientation of detectors in one focal plane detector array;

FIG. 6 is a chart indicating the formation of pseudodetector sums from the detectors of FIG. 5;

FIG. 8 is a schematic representation showing a field of view image crossing the first row of the detector array of FIG. 5;

FIG. 13 is a data storage map showing the preferred manner of data storage produced by the interface adapter;

FIG. 14 is an updated data storage map similar to that of FIG. 13;

FIG. 15 is an updated data storage map similar to that of FIG. 14;

DESCRIPTION OF THE PREFERRED EMBODIMENT

Figure 1:
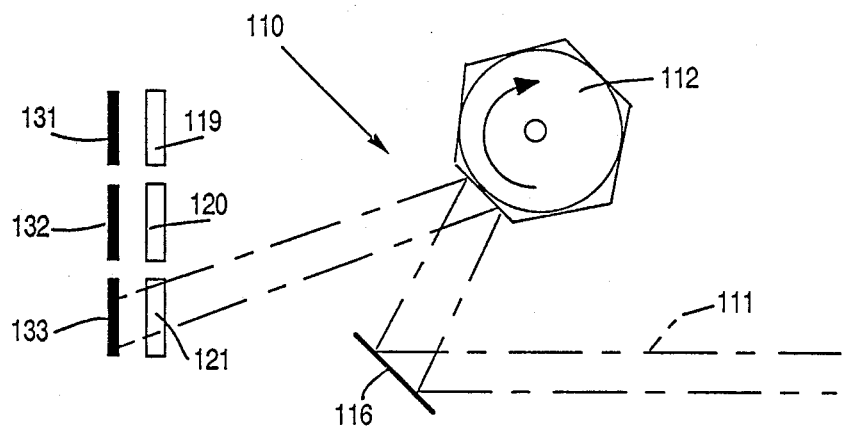
FIG. 1 is a schematic view of an optical scanner which may be used in the present invention.

FIG. 1 shows a scanning apparatus for scanning received radiant energy shown as 111 across a plurality of photodetector arrays 131, 132 and 133. The apparatus itself is a standard device which forms no part of the present invention and is shown for exemplary purposes only.

Radiant energy 111 is received in a telescope or the like and reflected by mirror 116 onto rotating multifaceted mirror 112. As mirror 112 rotates, the received energy is reflected across photodetector arrays 131, 132 and 133 which are placed in the focal plane of the receiving telescope. Optical filters 119, 120 and 121 are placed between mirror 112 and detector arrays 131, 132 and 133, respectively. Filters 119, 120 and 121 are spectral band filters such that the images generated by detectors 131, 132 and 133 represent the source image energy in the short, medium, and long wavelengths, respectively.

Figure 2:
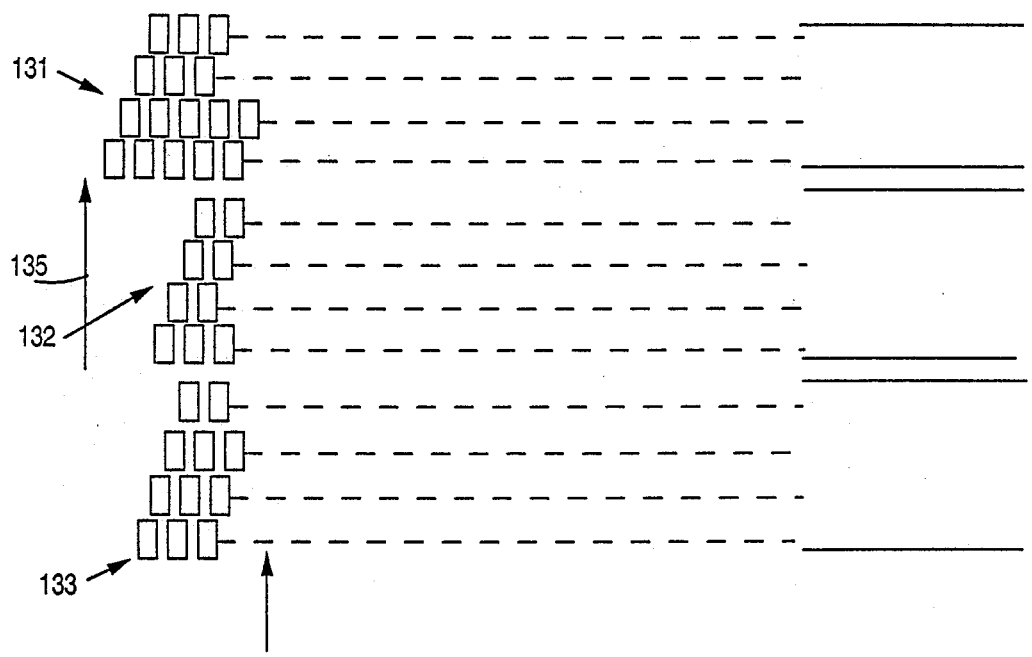
FIG. 2 is a schematic view of three detector arrays to be used in the present invention for detecting the three primary colors.

FIG. 2 shows a more detailed view of the detector arrays 131, 132 and 133. Each array consists of a plurality of rows of detectors. The number of rows to be used and the number of detectors in each row are determined in accordance with design constraints to be discussed hereinafter. It should be noted that each array is identical to the other arrays. The only difference between arrays is in that a different wavelength band of radiant energy is received by each. For example, array 131 may receive only short wavelength radiation while array 132 receives only medium wavelength radiation and array 133 receives only long wavelength radiation.

With this in mind, it will be understood that the present invention will be described with reference to only array 131 with the understanding that the configuration of the other arrays and processing techniques to be used therewith are identical to those discussed with respect to array 131.

FIG. 5 shows array 131 in greater detail. Preferably, array 131 contains several hundreds or thousands of individual detectors, 40 of which are shown as detectors D-1 through D-40. The detectors of the array are divided into four or more rows. The scanning apparatus of FIG. 1 causes a received field of view image to be scanned vertically along the arrays in he along scan direction as depicted by arrow 135 shown in FIGS. 2 and 5. The rows of detectors are aligned in the cross-scan direction defined as the direction perpendicular to arrow 35. In the along scan direction, the rows are offset by an amount equal to the detector-to-detector spacing within a row divided by the number of rows in the array.

Figure 3:
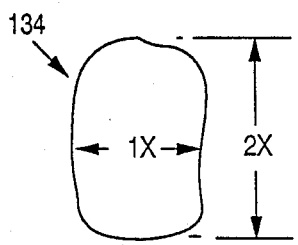
FIG. 3 is a schematic representation showing an optical blur representing a far-field point source object.
Figure 4:
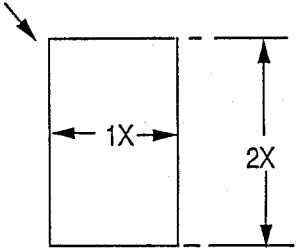
FIG. 4 is a schematic representation of one detector of a focal plane detector array.

As discussed above, the system of the present invention is designed to image far-field targets whose angular substance is small compared to the diffraction limit of the sensor telescope optics. Under these conditions, the targets are described as point sources. The number of detectors and the size of the detectors must be determined in relation to the particular image to be received. Due to optical effects of the telescope being used, a point source distant target image appears on the focal plane of the telescope as a characteristic blur. As shown in FIG. 3, the characteristic blur may have a general shape in which the along scan dimension B of the blur is approximately twice the cross-scan dimension A. Each detector of the detector array, as typified by the single detector shown in FIG. 4, has an along scan dimension approximately equal to the along scan dimension B of the characteristic blur and a cross-scan dimension which is approximately equal to the cross-scan dimension A of the characteristic blur. Accordingly, in this example the along scan dimension of each detector is approximately twice the cross-scan dimension of the detector.

Each detector can be a charge coupled device or other standard photosensitive element. The output of each detector is amplified or conditioned prior to processing. As mentioned above, the noise floor for signal detection is limited by the amplifier and generally not the detector. Accordingly, a reduction in size of the detectors in the along scan dimension below that of the blur along scan dimension would degrade the minimum size of objects which could be sensed and the range at which they could be detected since the noise level of the amplifier would not be reduced with the reduction in along scan dimension of the detector. An increase in size of the detector in the along scan dimension to a significantly greater dimension than the blur would produce signals of poor spatial resolution so that the position uncertainty of objects would increase. Due to these considerations, the along scan dimension of the detectors is made roughly equal to that of the envelope enclosing 80% of the energy of the blur.

The cross-scan dimension of the detectors is dictated b the field of view to be encompassed balanced by the number of channels which can be crowded into the focal plane area together with processing limitations of the data processing hardware which is used. The present invention uses detectors which have a cross-scan dimension equal to the blur cross-scan dimension in order to balance these factors and to provide a low ratio of clutter-to-point source image signals. Also, the detector size enables a powerful method for extracting the point source image signals from the reduced clutter signals to be used, as will be discussed.

In order to adequately fill the field of view, a large number of detectors is included in each row of the detector array. For the example to be discussed, each row will contain 108 detectors. The spacing between detectors is made to be approximately 0.2 blur widths in order to provide adequate detector separation. Therefore, the detectors in a given row are 1.2 blur widths spacing center to center.

The number of rows in the array determines the number of cross-scan samples of data to be processed. Accordingly, as the number of rows per array increases, the uncertainty in peak determination decreases. Two rows per array appeared to yield excessive uncertainty in peak determination and thus four rows per array has been chosen to be the minimum preferred. With four cross-scan samples per blur, the ideal peak magnitude uncertainty is reduced to less than 2 percent.

For purposes of further explanation, it will be assumed that each detector array has four rows of detectors. It will be understood that this type of focal plane design and processing design may be extended to five, eight or more rows of detectors with commensurate reduction of noise equivalent flux density and processing uncertainty as well as increased azimuthal resolution and data processing load. At larger row numbers, the field of view may become over-filled by the focal plan and data rates may become excessive.

As shown in FIG. 5, the row-to-row offset is 0.3 blur widths or an overlap of 0.7 blur widths. Offsetting the rows allows a determination of cross-scan position uncertainty which is small.

Figure 9:
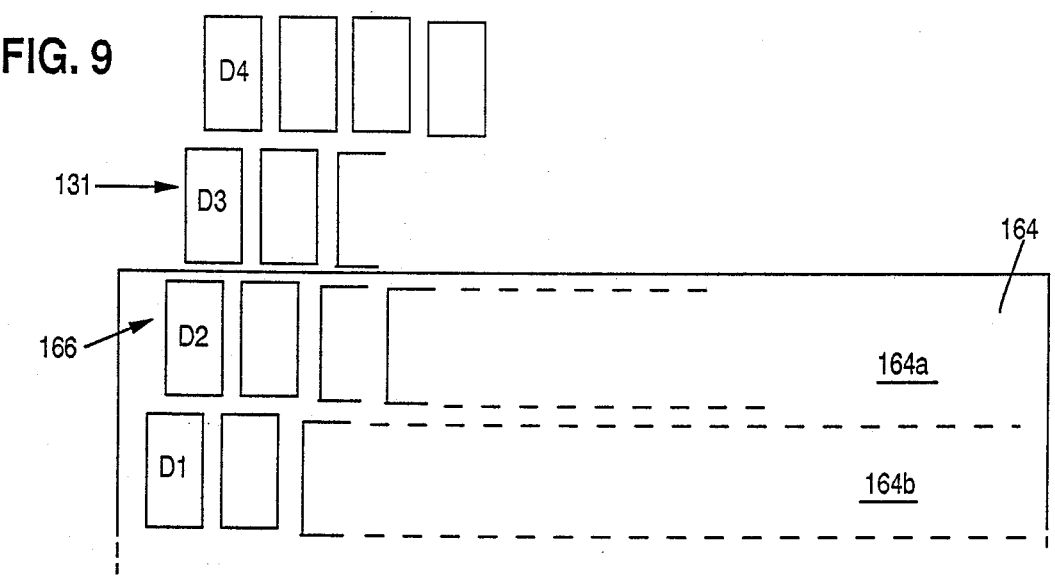
FIG. 9 is a schematic representation showing a field of view image crossing the second row of detectors of the detector array of FIG. 5.
Figure 10:
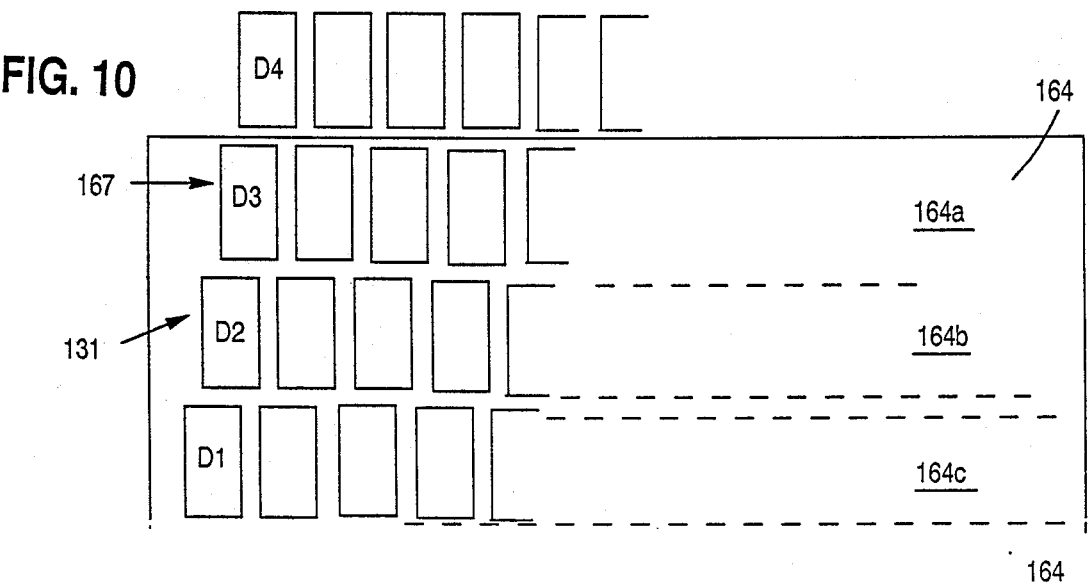
FIG. 10 is a schematic representation showing a field of view image crossing the third row of detectors of the detector array of FIG. 5.
Figure 11:
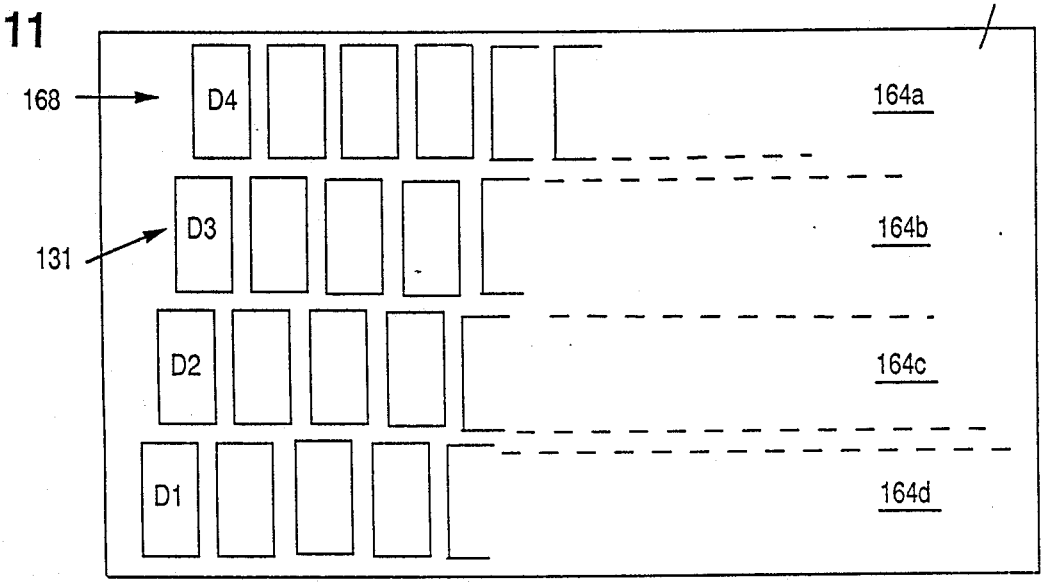
FIG. 11 is a schematic representation showing a field of view image crossing the fourth row of detectors of the detector array of FIG. 5.

Time delay integration (TDI) of a multi-row array of detectors is often employed to enhance signal-to-noise ratio or reduce noise equivalent flux density in arrays having no row to row offset. The concept of TDI processing is applied to the staggered row array of FIG. 5 by forming pseudodetector sums which are set forth in the chart of FIG. 6. As is apparent from FIG. 6, one pseudodetector sum is formed for each group of sequentially offset detector elements. The pseudodetector can be visualized as having a theoretical width equal to the width of a detector divided by the number of rows in an array and aligned in rows in the same manner as the array. In order to more fully understand the TDI concept as applied to array 131 reference is had to FIGS. 8–11. In FIG. 8, it will be seen that the field of view image 164 is beginning to be scanned over the detector array. The first portion of image 164 overlies the first row of detectors. At this time, a first time sample of the outputs of all detectors is taken. The data received is referred to as frame 1. FIG. 8 shows the image being scanned across the second row of detectors, row 166. Frame 2 information is obtained at this point in time. FIG. 9 shows the image being scanned across the third row, row 167. Frame 3 information is obtained at this point in time. FIG. 10 shows frame 4 information being obtained as the image 164 is scanned across row 168. From FIG. 6, it will be understood that pseudodetector sum P1 is formed by adding the outputs of detector D1 during frame 1, D2 during frame 2, D3 during frame 3, and D4 during frame 4. Each pseudodetector sum is formed in a similar manner to represent the summation of the outputs from our adjacent offset detectors taken from similar portions of image 164 during the scan of image 164. It should be understood that this description relates only to the first row of pseudodetector sums and that additional rows of pseudodetector sums are formed in a similar manner for additional portions of the image. The total number of pseudodetector sums in each row is equal to the total number of detectors in the array less N−1, where N is the number of detector rows. In the specific example set forth, 429 pseudo-detector sums are formed for each array.

Figure 7:
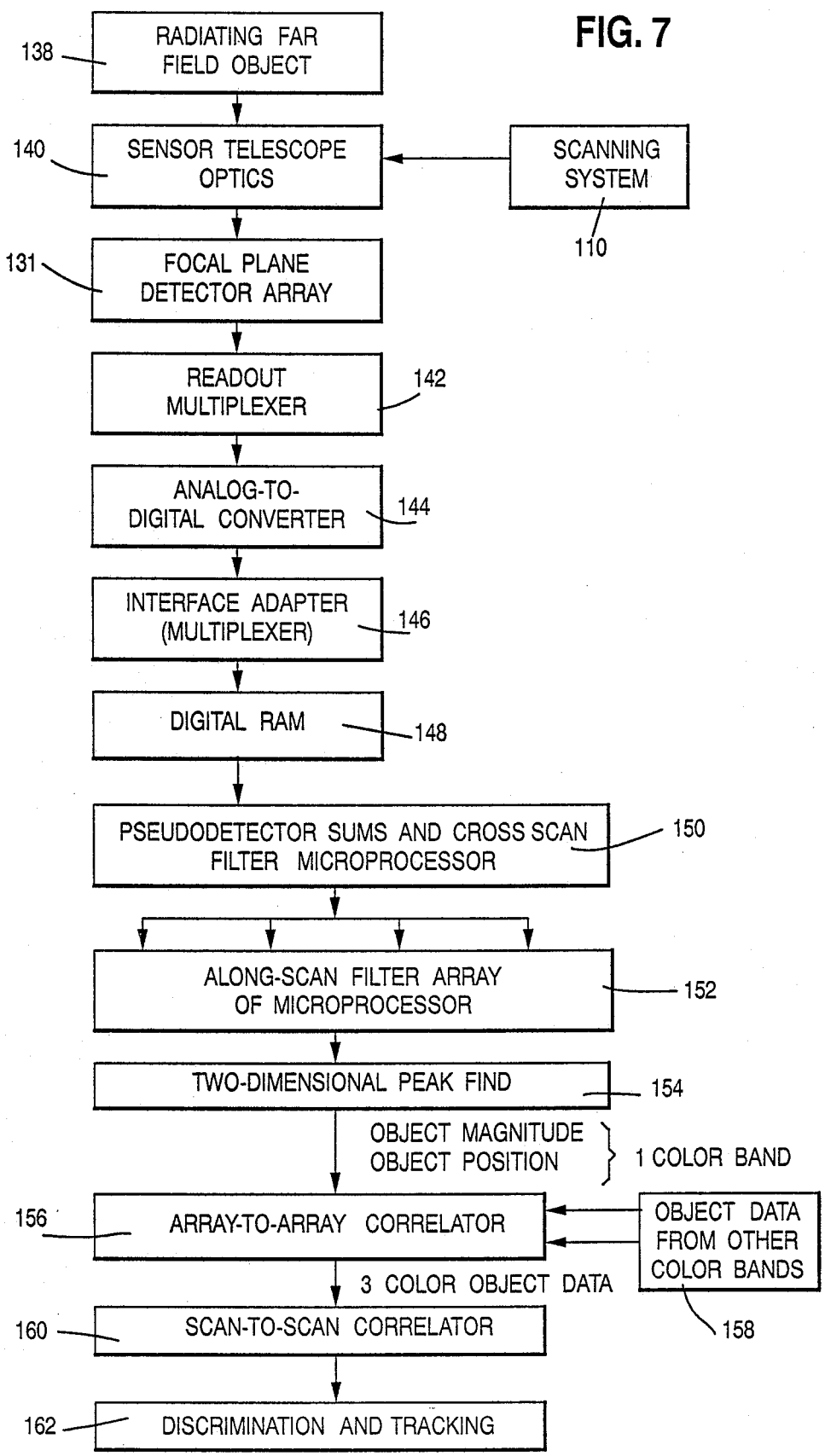
FIG. 7 is a block diagram depicting the operation of the system of the present invention.

FIG. 7 sets forth a block diagram describing the complete operation of the system of the present invention. A radiating far-field object 138 emits radiant energy which is picked up by the sensor telescope optics 140. Scanning system 110, one possible implementation of which is show in greater detail in FIG. 1, causes the sensed image to be scanned along the focal plane detector array 131 which is shown in greater detail in FIG. 5. Each frame of information is read out serially from the detectors of array 131 by read-out multiplexer 142. The frequency at which read-out multiplexer 142 reads frames of information from array 131 determines the maximum product of resolution and scan rate obtainable.

The time that it takes for one portion of image 164 to traverse one row of detectors, for example, the time it takes for the leading edge of image 164 to traverse row 165 as shown in FIG. 8, is referred to as a dwell. For adequate image resolution, a minimum of four samples per dwell to produce four frames of information per dwell is required. In the example discussed above, only one sample per dwell was described for simplicity.

The outputs from array 131 are in analog form. These outputs are received serially by analog-to-digital converter 144 and converted to digital form. An interface adapter 145 receives the digital output signals and assigns them to specific storage locations in digital RAM 148.

The data in RAM 148 is received by the microprocessor of block 150 which forms the pseudo-detector sums by TDI as shown in FIG. 6. The pseudodetector sums are stored and geometrically cross-scan filtered using a digital matched filter routine which can be implemented by a second order sine x/x bandpass filter.

In regard to cross-scan filtering of the pseudodetector sums, it should be clearly understood that each row of 429 pseudodetector sums is filtered individually. For example, referring again to FIGS. 8-11 wherein the imaging process using one sample per dwell is described for simplicity, it can be seen that image 164 is divided into four image sections referred to as 164a, 164b, 164c and 144d. The formation of pseudodetector sums described above was in reference to the pseudodetector sums for image section 164a. In other words, after image section 164a has traversed array 131 from row 165 to row 168, the first row of pseudodetector sums is formed. Similarly, a second row of pseudodetector sums is formed after image section 164b has completely traversed array 131 from row 165 through row 168. A third row of pseudodetector sums is formed for image section 164c and a fourth row is formed for image section 164d. Clearly, since the minimum number of samples per dwell to be used for adequate image resolution is four, a total of 16 rows of pseudo-detector sums must be formed for 16 image sections. In this case, the image sections necessarily overlap. Each row of pseudodetector sums is filtered using a symmetrical, linear phase, bandpass filter approximating a matched filter to the geometric shape of the optical blur pattern in the cross-scan direction. This processing detects the position and magnitude of point source signals while suppressing signals from the broad blurs produced by near-field objects and other non-point source phenomenon. The specific filter to be used can be a four sample by eight sample, second order sine x/x digital bandpass filter.

Again with reference to FIG. 7, it will be seen that after all rows of pseudodetector sums are cross scan filtered, the pseudodetector sums are along scan filtered. The along scan filtering is performed on the cross-scan-filtered pseudodetector sums which are produced at successive time samples. Accordingly, it will be understood that a total of 429 along scan filter routines must be performed simultaneously. These routines are performed in parallel using one or more microprocessors. The along scan filters used are similar to the cross-scan filters used and can be implemented by second order digital sine x/x bandpass filters.

Since sources in the near-field typically vary rapidly in time, the scintillation effects caused by the sources are frozen with each snapshot which is in effect taken by storing outputs from each of the detectors. Accordingly, in order to extract signals from point sources unambiguously from the rapidly scintillating near-field broad sources and background signals, cross-scan filtering is performed first since this dimension is purely geometrical in time stasis. If along scan filtering is performed before cross-scan filtering, the point source images may not be extracted as accurately.

After the cross-scan and along scan filtering routines, a peak find routine is performed at block 154. The peak find routine determines the maximum between two successive threshold crossings of the filtered pseudodetectorsums. The peak find routine includes identical routines which are performed in both the along scan and cross-scan directions. In each routine, the peak values are compared to a non-zero threshold and only those exceeding the threshold are retained. Ideally, with no noise, there would be four adjacent equal peak values in the cross-scan direction all with the same along scan address. Four peak values appear due to the fact that each pseudo-detector sum theoretically has a cross-scan dimension which is one-quarter of the width of one characteristic blur when four rows are used. When noise is added to the detector signals, the peaks will scatter in amplitude and along scan location. The simplest method for choosing the correct peak value in address is to describe a box of a predetermined number of locations about a non-zero peak. All but the maximum value within the box are eliminated and the box is moved to the maximum value and the process repeated. If two or more equal values appear within the box, they are assumed to be from the same target. That is, the value is taken for the peak and the centroid of their locations is taken for the address.

Object data from other color bands is determined in a similar manner indicated at box 158. Array to array correlation is performed at 156. In this routine, an object must appear in two or more arrays or be discarded.

The information obtained at block 156 for each scan is stored and correlated with previous scans in correlator 160. The object history produced by correlator 160 is fed to discrimination and tracking circuit 162. The object's trajectory can therefore be predicted and the object intercepted.

Figure 12:
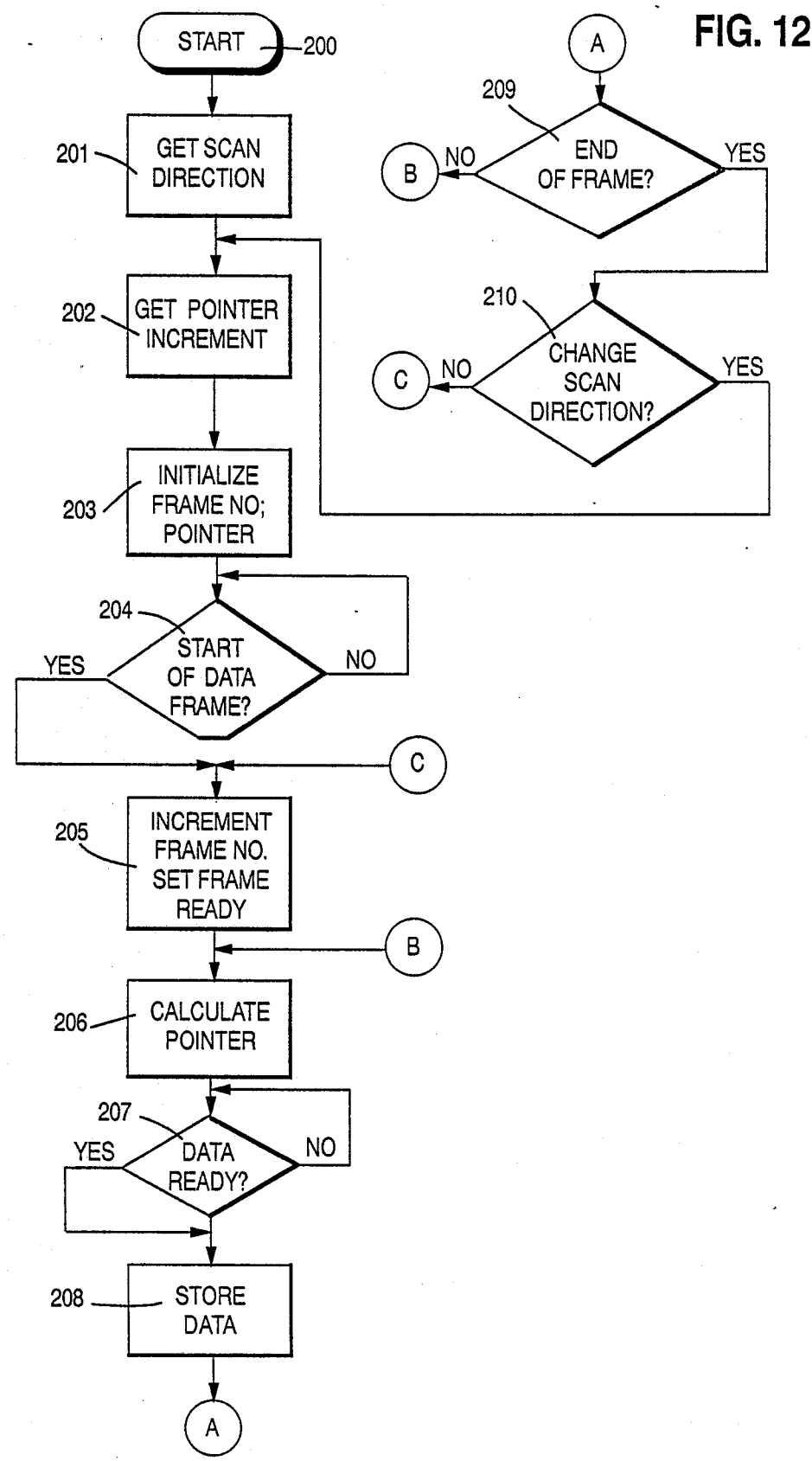
FIG. 12 is a flow diagram showing the steps to be carried out in the interface adapter of FIG. 7.

FIG. 12 shows a flow diagram for one form of an interface adapter 146. The routine of FIG. 12 should be performed for each scan. At step 200, the routine is entered. At step 201, the scan direction is determined. For the example set forth, the scan direction never changes nd is always vertically upward. However, the routine is designed to operate for both up and downward movement in the vertical scan direction. At step 202, the pointer increment is obtained. The pointer increment is determined so that the data received by the interface adapter is organized according to the preferred delays for a four-row array with four samples per dwell, as will be discussed below. Step 203 initializes the frame number and pointer. Step 204 determines whether a new data frame has been started or not. If a new data frame has not been started, the program waits for the beginning of the next data frame. Step 205 increments the frame number. Step 206 calculates the pointer which determines the memory location in which the incoming data is to be stored. Step 207 determines whether data is available to be stored. If not, the program waits for data to be supplied. Step 208 stores the data in the calculated memory location. Step 209 determines if all data from the present frame has been stored. If not, the program returns to step 206 an recalculates the pointer to store the next incoming data. If, at step 209, the end of a frame has been reached, the program proceeds to step 210 which determines the scan direction. If the scan direction has changed, the program must return to step 202 in order to obtain the new pointer increment. If the scan direction has to changed, the program proceeds to step 205 to increment the frame number and continues to store data in the next succeeding frame.

FIG. 13 shows a data storage map as it would appear while data from the 14th frame is being read into the memory locations by the interface adapter of FIG. 12. The memory locations are indicated in octal numbering. The vertical axis of the data storage map indicates the memory start locations. The horizontal axis indicates the specific memory locations. In parentheses below each memory location the detector element from which the data was taken is indicated. Memory locations are only included for 16 detectors, it being understood that there would be sufficient memory locations to store data from each detector of the array. In the present example, there are 432 detectors. The data storage map of FIG. 13 is calculated based upon there being four time samples per dwell to produce four frames of information per dwell. Accordingly, 16 frames of information are obtained in the time that it tasks for the field of view image to be scanned across all four rows of the array. Therefore, 16 memory locations are allocated to each detector. The interface adapter calculates the pointer such that data from detector D1 during the first frame is stored in memory location 000. As seen in FIG. 13, data from the second frame is stored in location 200 (OCTAL). Data from successive frames fill memory locations vertically on the map. Data from detector D2 from the first frame is stored in location 3001 (OCTAL) and data from successive frames fill vertically adjacent memory locations up to location 3601 (OCTAL). Data from the fifth frame is stored in location 001 (OCTAL). Data for each detector is similarly offset such that each row of memory locations stores data for each set of four sequentially numbered detectors, which data is offset by four time samples. Accordingly, with reference to FIG. 5, it can be seen that data from each row of detectors, for example row 165, taken during the same time sample, is stored in the same row and data from adjacent rows taken four time samples later is stored in the same row. Consequently, the data in each memory location row corresponds to data frames taken from the same image section of the field of view image as it is scanned across each row of detectors. The data from each row can be read out sequentially and added in a trivial manner to produce the pseudodetector sums.

FIG. 13 depicts the situation where data from detector D5 at the 14th data frame is about to be entered in location 3200 (OCTAL). The data from the 13th frame has all been entered and the first row of memory locations are ready to be read out by microprocessor of block 150 to for the first pseudo-detector sums. Similarly, FIG. 14 depicts the storage map after the 15th data frame has been completely read in and data during the 16th storage frame for detector D5 is being read into memory location 3604 (OCTAL). At this point in time, the third row of memory locations is being read out by microprocessor 150 to form the third set of pseudodetector sums. In a similar manner, FIG. 15 shows the data storage map during storage of data from frame 18. The data for that frame from detector D5 is about to be overwritten into location 204 (OCTAL). At this point in time, the first portion of tee field of view image has been scanned across all the rows of detectors and all pseudo-detectors associated with the first portion of the image have been calculated by the microprocessor. Accordingly, the storage locations associated therewith, comprising the first four rows of memory locations, can be overwritten.

Clearly, it can be seen that the interface adapter organizes the data according to the preferred delays for a four-row array with four time samples per dwell. The rearrangement for larger numbers of rows or greater time sampling rates should be obvious. It should be noted that since the memory locations are overwritten in stages, only a few storage rows are valid at any one time. Accordingly, microprocessor 115 must keep up with the interface adapter or it will get bad data. The alternative to this storage arrangement would be to store each frame of data in sequential memory cells and have the microprocessor calculate each pointer to access the properly delayed data. As the processor is quite busy, however, it usually makes more sense to unload this task on the interface adapter.

Figure 16:
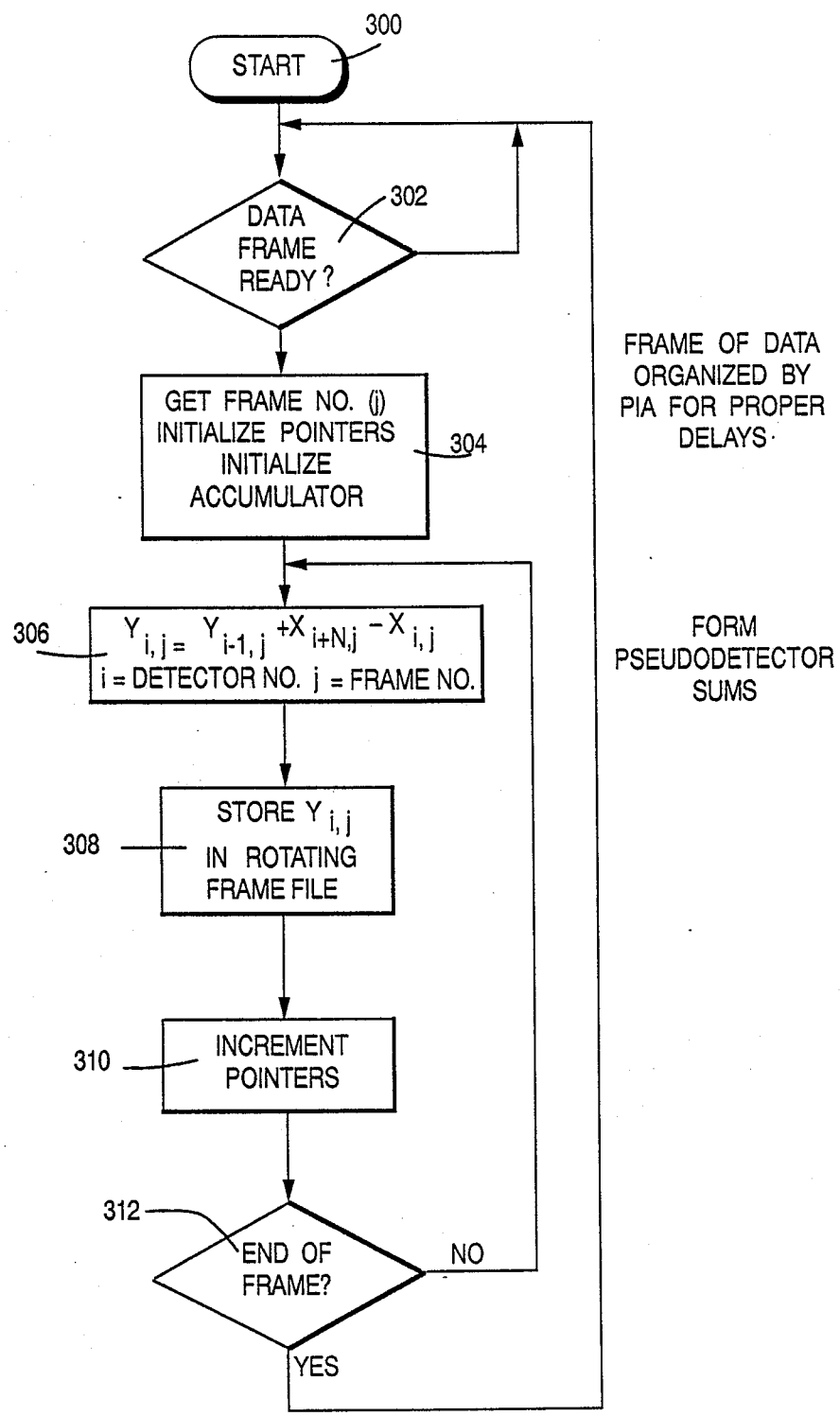
FIG. 16 is a flow diagram showing the steps to be carried out in the pseudodetector sum block of FIG. 7.

FIG. 16 shows a flow diagram for the time delay integration routine performed by microprocessor 150 for forming the pseudodetector sums. Step 300 of the flow diagram is the point at which the routine is entered. The routine is performed 429 times to produce 429 pseudodetector sums for each row of the time delay storage map of FIG. 13. The routine is first performed for each scan after the 1th data frame has been entered into the storage map. At step 302, the routine determines whether the data frame is ready. If the data frame is not ready, the routine waits until all entries int the storage map have been made for the data frame of interest. Step 304 obtains the data frame number, initializes the pointers and initializes the accumulator. Initially, the sum of the data for detectors D1, D2, D3 and D4 is stored in file Y (l,j) and the pointer is set at the location for detector D5 in the row of interest. Step 306 calculates a pseudo-detector sum. Essentially, the pseudodetector summation takes the form of a running average represented by:

$$Y_{i,j} = Y_{i-1,j} + X_{i+n,j} - X_{i,j} \quad (1)$$

where n is the number of rows in the detector array, Y is the pseudodetector sum, X is the detector data, i is the detector number and j is the frame number. Accordingly, it will be understood that each pseudo-detector sum Y is the summation of the outputs of four sequentially numbered detectors formed by adding the data in n sequential memory locations of a row indicated in the storage maps of FIGS. 13, 14 and 15. Step 308 stores each sequentially formed pseudo-detector sum in a rotating frame file. Step 310 increments the pointers. Step 312 determines whether the end of the frame has been reached. If the end of the frame has not been reached, the routine returns to step 306 where the next pseudodetector sum is formed. If the end of the frame has been reached, the routine returns to step 302 to perform the summation process on the row of memory locations in FIG. 13 completed by the next data frame.

Figure 17:
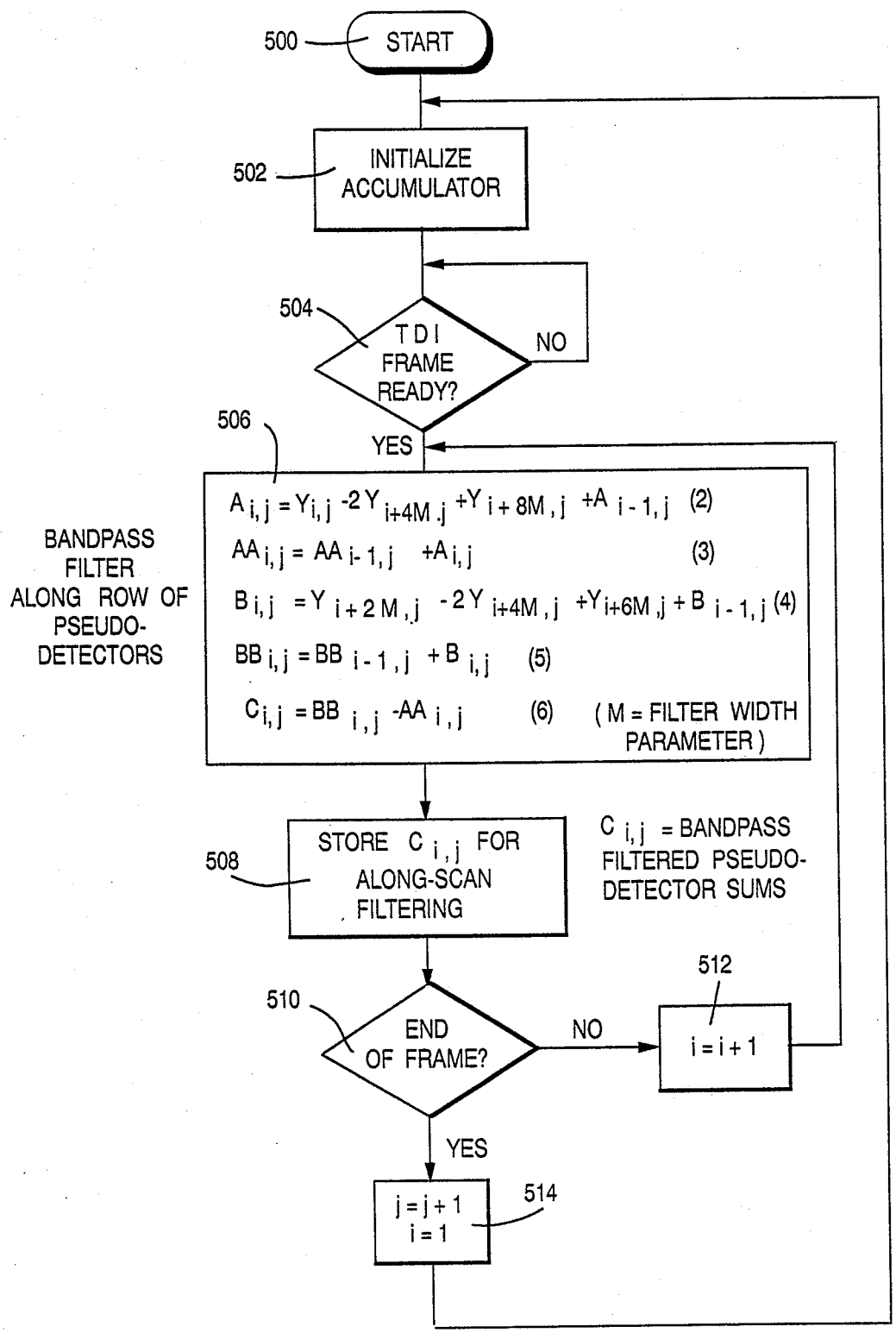
FIG. 17 is a flow diagram showing the steps to be carried out in the cross-scan filter block of FIG. 7.

FIG. 17 shows the cross-scan filter routine to be performed on the pseudodetector sums formed by the routine of FIG. 16. At step 500, the cross-scan filter routine is initiated. At step 502, the accumulators are initialized. At step 504, the routine determines if all time delay integration steps have been performed and thus all pseudo-detector sums have been calculated for a particular frame of information. A band-pass filter is implemented by taking the difference between two low-pass filters with a ratio of 2:1 in cut-off frequencies. The low pass filters used in the example are integer coefficient, recursive sine x/x filters.

The first low-pass filter output is determined by the mathematical equations:

$$A_{i,j} = Y_{i,j} - 2Y_{i+4m,j} + Y_{i+8m,j} + A_{i-1,j} \quad (2)$$

$$AA_{i,j} = AA_{i-j} + A_{i,j} \quad (3)$$

where AA is the band-pass filer output and A is an intermediate quantity determined to facilitate calculation.

The second low-pass filter has a pass-band larger than AA and is determined by the equations:

$$B_{i,j} = Y_{i+2,j} - 2Y_{i+4m,j} + Y_{i+6m,j} + B_{i-1,j} \quad (4)$$

$$BB_{i,j} = BB_{i-1,j} + B_{i,j} \quad (5)$$

where BB is the filter output and B is an intermediate numerical step provided for ease of calculation.

The optimum value f m for the best approximation to a matched filter for the target pulse should be approximately ⅓ the number of samples per dwell. In the example chosen, with approximately 4 samples per dwell in the cross scan direction, m=1.

The band-pass filter output is given by the mathematical formula:

$$C_{i,j} = (BB_{i,j} - (AA_{i,j})/4)/4m^2 \quad (6)$$

where C is the band-pass filter output. Note that inverse scaling factors (4) and (4 $m^2$) must be applied to retain original dimensions.

In equations 2-6, Y indicates a pseudo-detector sum, i indicates detector or pseudodetector number, j indicates from number and m indicates the filter width parameter which determines the response of the filter.

Step 508 stores each bandpass filtered pseudo-detector sum C. Step 510 determines whether the end of the frame has been reached. If not, step 512 increments the detector number i add returns the routine to step 506. If the end of the frame has been reached, the frame number j is incremented and the detector number i is returned to 1. The routine is then retuned to step 502 to filter the next row of pseudo-detector sums.

Figure 18A:
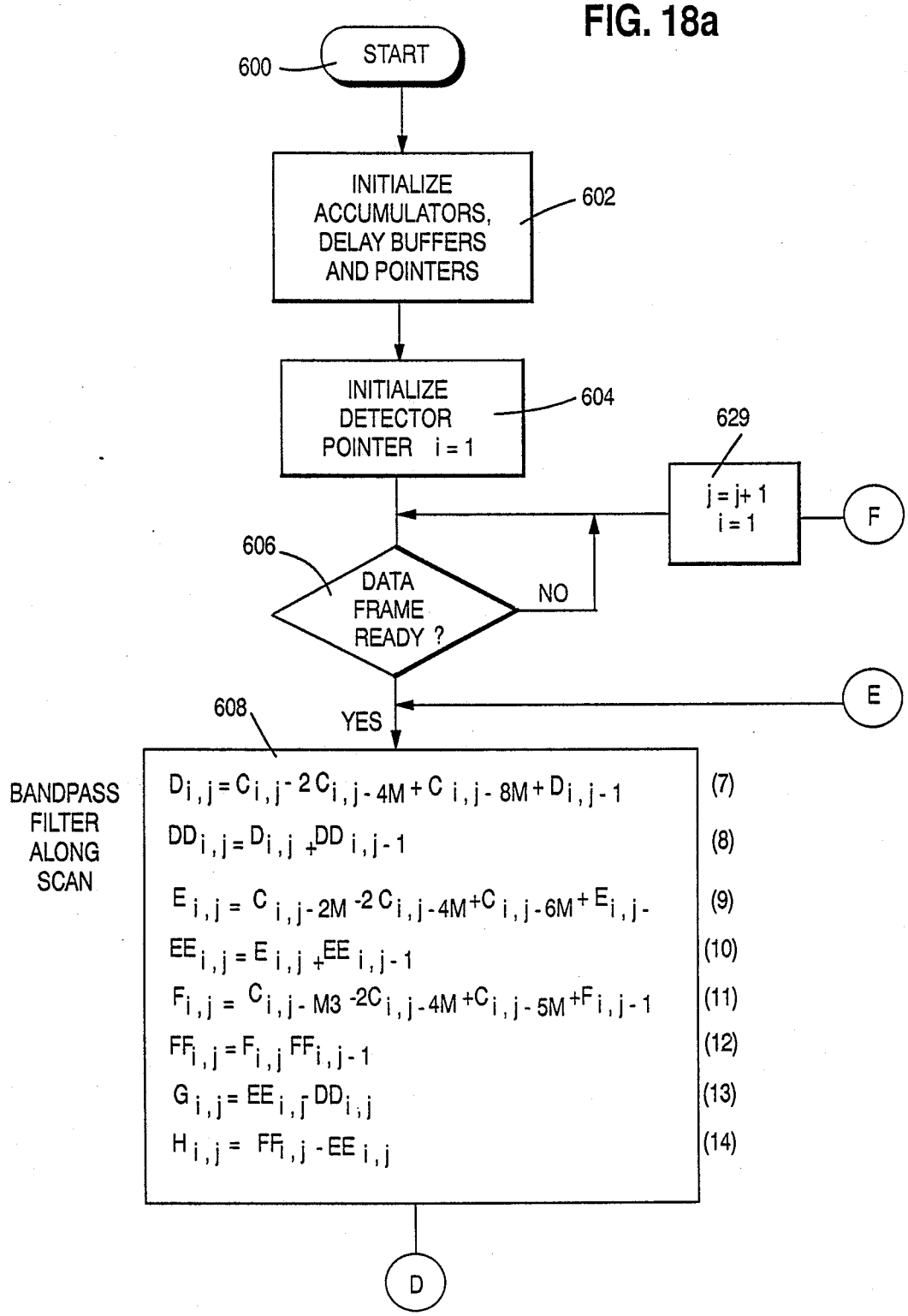
FIGS. 18-A and 18-B show a flow diagram depicting the steps to be carried out in the along scan filter block of FIG. 7.
Figure 18B:
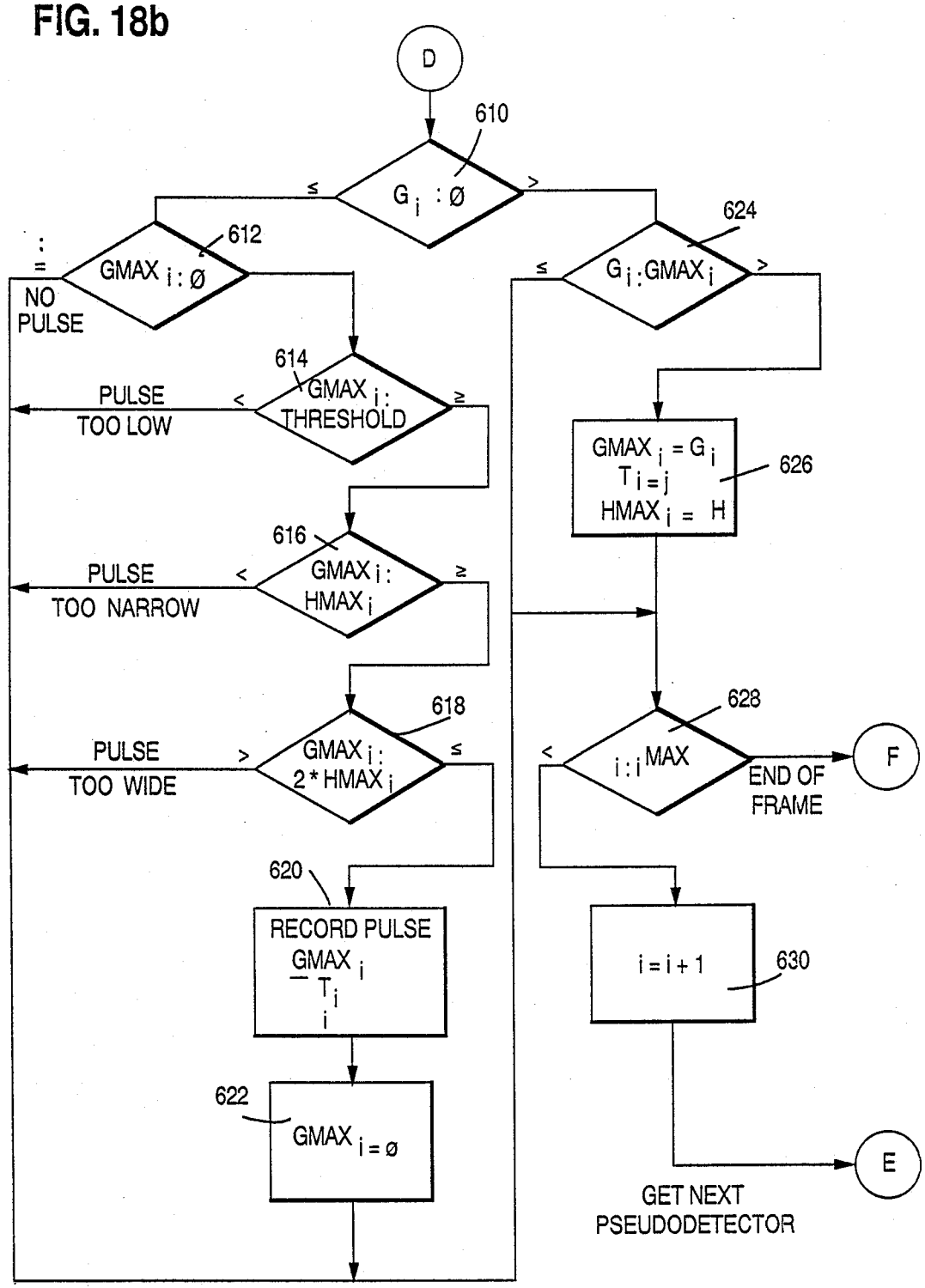

FIGS. 18A and 18B show an along scan filter and pulse shape discriminating routine. Step 601 initiate the routine which is carried out for each filtered pseudodetector sum generated by the routine of FIG. 17. Step 602 initializes the accumulators, buffers and pointers to be used in the routine. Step 604 initializes the detector pointer i to 1. Step 606 determines whether all information for the data frame of interest has been generated. If not, the routine waits for the data frame information to be generated. If the data frame is ready, control is passed to step 608 which comprises two digital bandpass filters formed from three low-pass filter algorithms. The three low-pass filter algorithms have cut-off frequencies with the ratio 4:2:1.

The filter with the lowest cut-off frequency is defined by the following equations:

$$D_{i,j} = C_{i,j} - 3C_{i,j-4m} + C_{i,j-8m} + D_{i,j-1} \quad (7)$$

$$DD_{i,j} = D_{i,j} + DD_{i,j-1} \quad (8)$$

where DD indicates the first low-pass filter output and D represents an intermediate value generated to facilitate calculation.

The low-pass filter having an intermediate cut-off frequency is determined as follows:

$$E_{i,j} = C_{i,j-2m} - 2C_{i,j-4m} + C_{i,j-6m} + E_{i,j-1} \quad (9)$$

$$EE_{i,j} = E_{i,y} + EE_{j-1} \quad (10)$$

where EE represents the second low-pass filter output and E represents an intermediate result generated to facilitate calculation.

The low-pass filter having the highest cutoff frequency is determined by the equations:

$$F_{i,j} = C_{i,j-3m} - 2C_{i,j-ym} + C_{i,j-5m} + F_{i,j-1} \quad (11)$$

$$FF_{ij} = F_{i,j} + FF_{i,j-1} \quad (12)$$

where FF is the output of the third low-pass filter and F is an intermediate result generated to facilitate calculation.

The first band-pass filter is provided by taking the difference between the two low-pass filters with a ratio of 2:1 in cut-off frequencies, as follows:

$$G_{i,j} = (EE_{i,j} - (DD_{i,j})/4)/(4m^2) \quad (13)$$

where G is the output of the band-pass filter.

The second band-pass filter is formed by taking the difference of the low-pass filters having cut-off frequency ratios 4:2 as follows:

$$H_{i,j} = (FF_{i,j} - (EE_{i,j})/4)/m^2 \quad (14)$$

where H is the output of the band-pass filter.

In equations 7–14, i,j and m represent the same parameters as discussed with respect to equations 2–6.

Pulse width may be characterized by the ratios of the outputs G and H of the two band-pass filters at the peak of a pulse. This ratio characterizes the spatial frequency distribution of the target pulse, and may be used as a discriminant for distinguishing between targets. If desired, this discrimination method may be applied similarly to the cross-scan filtering process. Pulse width gates of plus or minus 40 percent of nominal may be implemented by a simple compare, shift and compare sequence as set forth in FIG. 18B.

Peak finding and thresholding proceed as follows: Step 610 compares G with zero, if G is greater than zero, step 624 compares the value for G with the previous recorded maximum for G. If G is less than or equal to the previous recorded maximum, the routine skips to step 628 which determines the end of the frame. If the end of the frame has been reached, the frame number j is incremented by one and detector pointer i is reset to one at step 629 after which control is returned to step 606. If the end of the frame has not been reached, the pointer i is incremented by one and control is returned of step 608.

If, at step 624, it was determined that G is greater than the previous value for the maximum of G, step 626 records G as the new maximum value, records the frame number j in register T, and records the value of H as the new maximum for H. Control is then passed to step 628.

If, at step 610, t was determined that the value of G is less than or equal to zero, step 612 determines whether the recorded value for the maximum of G is greater than or equal to zero. If it is equal to zero, the routine determines that no pulse has occurred and control is passed to step 628. If the maximum value of G is greater than zero, control is passed to step 614 which compares the maximum value with a predetermined threshold. If the maximum is less than the threshold, the routine determines that the pulse peak is too low to indicate a point source object and control is passed to step 628. If the maximum value of G is greater than or equal to the threshold, step 616 compares the maximum value of G with the maximum value of H. If the maximum of G is less than the maximum of H, it is determined that the pulse is too narrow to be a point source object and control is passed to step 628. If the maximum of G is greater than or equal to the maximum of H, control is passed to step 618 which compares the maximum of G with two times the maximum of H. If the maximum of G is determined to be greater, the routine determines that the pulse is too wide to be a point source object and control is passed to step 628. Otherwise, control is passed to step 620 which permanently records the values of the maximum of G, T and i. Step 622 then resets the register storing the maximum of G value to zero and passes control to step 628.

As can be seen from the above description, in this implementation, the time delay integration formation of the pseudodetector sums is separated from the cross-scan and along scan filters, and the individual filter components are also separated. Depending on the hardware architecture, it may be faster to combine the pseudodetector sum and cross-scan filter algorithms into one combined algorithm form. Also, it should be noted that the filter algorithm itself is not unique to the process and other filters may be employed.

Figure 19A:
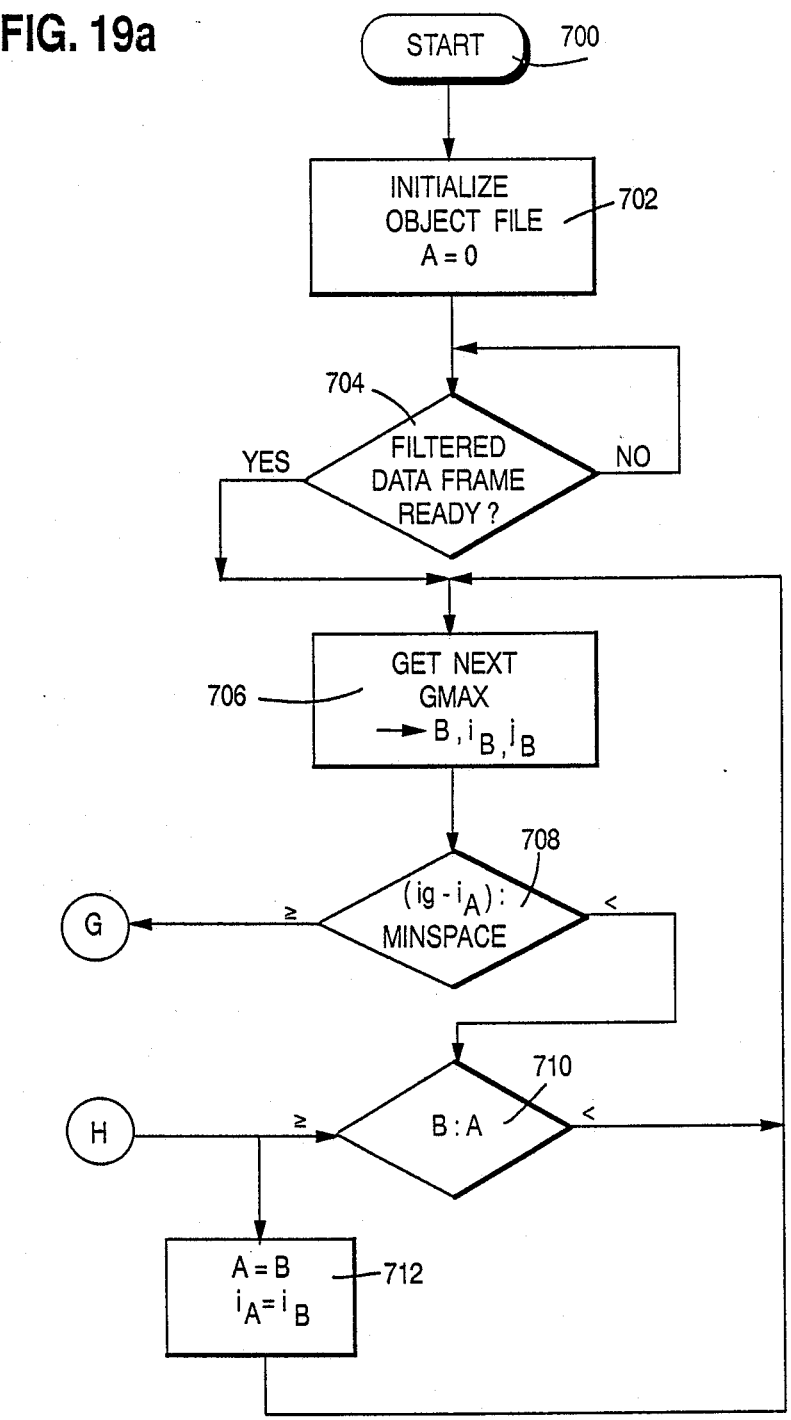
FIGS. 19-A and 19-B show a flow diagram depicting the steps to be carried out in the two-dimensional peak find block of FIG. 7.
Figure 19B:
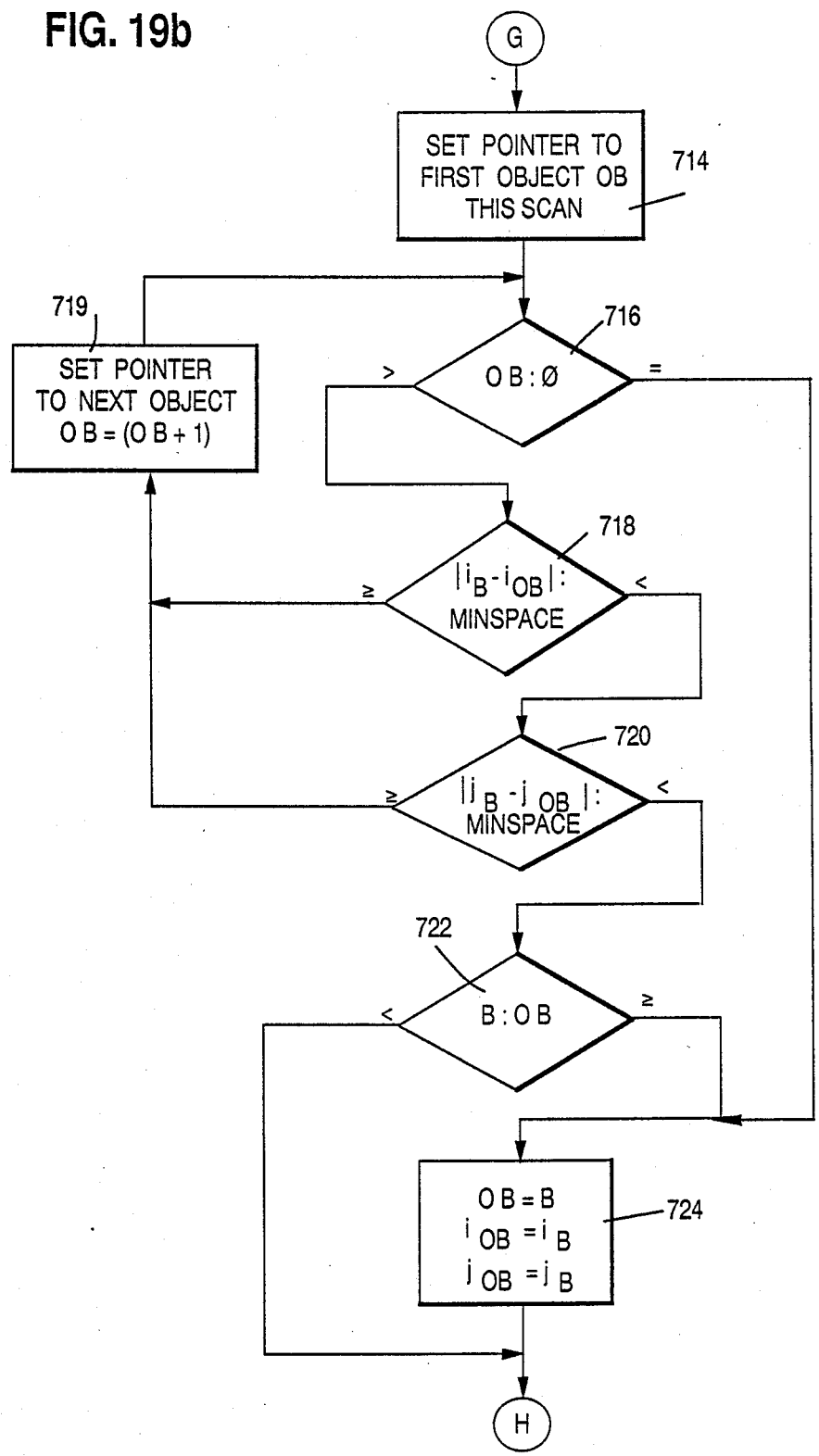

A plurality of along scan filter routines of FIGS. 18A and 18B are performed in parallel at block 152 of FIG. 7. For the example under discussion, 429 such parallel routines are performed and the results are passed to peak find block 154. FIGS. 19A and 19B show a flow diagram of a cross-scan peak find routine o be carried out at block 154 of FIG. 7.

In FIG. 19A, step 700 initiates the routine. The routine is carried out for each filtered data frame of pseudodetector sums. Step 702 initializes an object file A. Step 704 determines whether the filtered data frame is ready. If the data frame is not ready, the routine waits for all filtering operations on the data frame to be carried out. Step 706 reads in the next maximum G value as determined by the along scan filter routine of FIGS. 18A and 18B. That value is assigned to register B. The frame number j and the detector pointer i are assigned to registers $j_b$ and $i_b$, respectively. Step 708 compares the cross-scan distance between the location of the presently read maximum value of G, stored at $i_B$ and the location of the previous maximum value of G, stored at $i_A$. This distance is compared to a minimum space. If the distance is less than a minimum space, step 710 determines the relative values of B and A. If B is greater than or equal to A, the object file is updated by making B the new value of A and making $i_b$ the new value for $i_a$. The routine then returns to step 706 to continue the comparison with additional values of G. If B is less than A, the object file is not updated and the routine returns to step 706.

If, at step 708, the distance between $i_B$ and $i_A$ is greater than or equal to the minimum space defined, this would indicate that B is a separate object. However, background and noise or asymmetry of a resolved target will cause peaks from a given target to appear in different data frames. This tends to produce "shadow" objects which must be eliminated. To eliminate them, all peaks within a given solid angle are compared, and the largest value is selected and recorded as an object along with its coordinates by the routine of FIG. 19B. In FIG. 19B, step 714 sets a pointer to the first object OB located in the scan. Step 716 compares OB to zero. If OB equals zero, OB is updated along with its coordinates in step 724 to be equal to B and its coordinates. If OB is greater than zero, step 718 compares the cross-scan distance between B and OB with a predetermined minimum space. If the distance is greater than or equal to the minimum space, the routine goes to step 719 which increments the pointer to the next object and returns to step 716 to compare the next object with zero. If the distance calculated in step 718 is less than the minimum space, the routine goes to step 720 which calculates the along scan distance between B and OB. If this distance is greater than or equal to the minimum defined space, the outline goes to step 719. If this distance is less than the minimum space, the routine advances to step 722 to determine which of B and OB is the actual object. A direct comparison between B and OB is made. If OB is greater, the routine advances to step 724 where OB is updated with the value of B. From step 724, the routine advances to step 712 where A and $i_A$ are updated with the values of B and $i_B$. If step 722 determines that B is less than OB, B is determined to be a shadow and its value is not stored as an object. The routine advances to step 712 where the value of A and its address are updated with B and its address. The routine then returns to step 706.

Referring again to FIG. 7, array-to-array correlator 156 receives one magnitude and two orthogonal addresses for each point source in each of three arrays developed by peak fin routines 154 for each array. Although not shown, a process somewhat similar to that carried out in the peak find routine of FIGS. 19A and 19B is followed for array-to-array correlation except that generally an object must appear in two or more arrays or be discarded. This routine would be obvious to one of ordinary skill in the art. Similarly, the scan-to-scan correlator 160 and discrimination and tracking routine 162 would be obvious to one of ordinary skill in the art and will not be disclosed in detail here.

The above description is set forth for purposes of illustration only. As should be apparent, numerous modifications, additions and variations of the present invention may be made without departing from the scope thereof as defined by the appended claims.

I claim:

1. An imaging system, comprising:
   means for receiving energy from a field of view and for scanning said received energy across a two-dimensional focal plane in a scan direction;
   detector means positioned in said focal plane for receiving said energy, said detector means comprising a plurality of detector elements, said elements being positioned in an array with elements along said scan direction being offset transversely to the scan direction and overlapping with respect to each other from leading elements to trailing elements, each of said elements producing output signals;
   processing means for receiving said output signals from each of said elements, delaying output signals from said leading elements in said array and adding said delayed output signals to output signals from overlapping trailing elements in said array; and
   utilization means for receiving said added signals and forming image signals in response thereto.

2. The imaging system as set forth in claim 1, wherein each of said elements has an along scan dimension and a cross-scan dimension which are approximately equal to the along scan dimension and the cross-scan dimension of an optical blur formed on said focal plane by said receiving means in response to the reception of energy from a ar-field point source object.

3. The imaging system set forth in claim 1, wherein said elements are disposed in a plurality of aligned rows in the cross-scan direction.

4. The imaging system as set forth in claim 2, wherein said adjacent elements overlap and wherein said offset is equal to the detector-to-detector spacing in a row divided by N where N is the number of rows in said array.

5. The imaging system as set forth in claim 4, wherein said added signals are produced for each delayed combination of N sequentially staggered detectors, each of said added signals being defined as one pseudodetector sum.

6. The imaging system as set forth in claim 5 and further wherein said processing means includes means for spatially filtering said pseudodetector sums in the cross-scan direction.

7. The imaging system as set forth in claim 5 and further wherein said processing means includes means for filtering said pseudodetector sums in the scan direction.

8. The imaging system as set forth in claim 6 and further including means for filtering said filtered sums in the said direction.

9. The imaging system as set forth in claim 1 and further including multiplexing means for serially applying said output signals to said processing means.

10. The imaging system as set forth in claim 9 and further wherein said processing means includes interface adapter means for receiving said serial output signals and storing said output signals in predetermined memory locations.

11. The imaging system as set forth in claim 8 and further including mean for determining peak values of said cross-scan direction filtered and said scan direction filtered pseudodetector sums.

12. The imaging system as set forth in claim 1, wherein said detector means comprises a plurality of said arrays, and further including filter means for dividing said energy into a plurality of frequency bands, a different one of said bands being received by a different one of said arrays, and further including a separate one of said processing means for receiving output signals from each of said arrays.

13. The imaging system as set forth in claim 12 and further wherein said utilization means includes means for correlating said added signals from each of said processing means with corresponding added signals from other of said processing means.

14. The imaging system as set forth in claim 1, wherein said receiving means comprises a telescope.

15. The imaging system as set forth in claim 14, wherein said detector elements are photosensors.

16. A method for the production of signals for use in radiant imaging of objects, comprising:
   positioning a plurality of detector elements in an array with elements in a first direction being offset transversely to the first direction and overlapping with respect to each other from leading elements to trailing elements;
   receiving energy from a field of view;
   scanning said received energy across said array in said first direction from leading elements to trailing elements;
   receiving output signals from each of said elements and delaying output signals from said leading elements in said array and adding said delayed output signals to output signals received from overlapping trailing elements in said array.

17. The method as set forth in claim 16 and further including the step of determining the dimensions of the area of said array covered by the energy received from a distant point source target, and forming each of said detector elements with dimensions approximately equal to the dimensions of said area.

18. The method as set forth in claim 16, including the step of aligning said detector elements in a plurality of rows in a direction perpendicular to said first direction.

19. The method as set forth in claim 18 and further including the step of making the offset of said detector elements equal to the detector-to-detector spacing in a row divided by N where N is the number of rows in said array.

20. The method as set forth in claim 19, wherein the step of adding said delayed output signals to output signals from trailing elements in said array includes the step of forming a sum for each delayed combination of N sequentially offset detectors, each of said sums being defined as one pseudodetector sum.

21. The method as set forth i claim 20 and further including the step of geometrically filtering said pseudodetector sums in a direction perpendicular to said first direction.

22. The method as set forth in claim 20 and further including the step of filtering said pseudo-detector sums in said first direction.

23. The method as set forth in claim 21 and further including the step of filtering said filtered sums in said first direction.

24. The method as set forth in claim 20 and further including the step of serially accessing each of said detector elements by a multiplex or and reading said outputs serially 25. The method as set forth in claim 23 and further including the step of storing said serially read output signals in predetermined memory locations such that said pseudodetector sums can be obtained by summing data in sequential memory locations.

* * * * *